United States Patent
Peregrina Loera et al.

(10) Patent No.: US 9,802,517 B1
(45) Date of Patent: Oct. 31, 2017

(54) ALIGNING TOWER STRUCTURE FOR LOCATING A SIDE SHIELD ON A BASE OF A VEHICLE SEAT

(71) Applicant: Ford Global Technologies, LLC, Dearborn, MI (US)

(72) Inventors: Jose Alfredo Peregrina Loera, Mexico City (MX); Francisco Javier Ferreira YaÃ±ez, Mexico City (MX); Edgardo F. Ortiz Hernandez, Toluca (MX); Carlos Caballero De Ita, Benito Juarez (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/096,554

(22) Filed: Apr. 12, 2016

(51) Int. Cl.
*B60N 2/44* (2006.01)

(52) U.S. Cl.
CPC ........................................ *B60N 2/44* (2013.01)

(58) Field of Classification Search
CPC ....................................................... B60N 2/44
USPC ............................... 297/452.38, 463.1, 463.2
See application file for complete search history.

(56) References Cited

U.S. PATENT DOCUMENTS

| | | | |
|---|---|---|---|
| 4,998,772 A | 3/1991 | Safran et al. | |
| 5,007,682 A | 4/1991 | Kuwabara et al. | |
| 6,149,241 A * | 11/2000 | Waku | B60N 2/015 297/452.38 X |
| 7,237,846 B1 | 7/2007 | Arima | |
| 7,997,656 B2 | 8/2011 | Inagaki et al. | |
| 8,302,994 B2 | 11/2012 | Ko | |
| 2012/0313408 A1 | 12/2012 | Nagata et al. | |

* cited by examiner

*Primary Examiner* — Anthony D Barfield
(74) *Attorney, Agent, or Firm* — Vichit Chea; Price Heneveld LLP (57) ABSTRACT

A vehicle seat includes a seat base, a side shield coupled to the seat base and defining inward and outward surfaces and an attachment tower extending from a central portion of the inward surface to an attachment flange of the seat base. The side shield conceals the attachment tower and the attachment flange, and the attachment tower defines a guide for connecting the attachment tower and flange.

20 Claims, 9 Drawing Sheets

ALIGNING TOWER STRUCTURE FOR LOCATING A SIDE SHIELD ON A BASE OF A VEHICLE SEAT

FIELD OF THE INVENTION

The present invention generally relates to vehicle seating, and more specifically, an attachment feature for aligning a side shield onto a base of a vehicle seat.

BACKGROUND OF THE INVENTION

During the assembly of vehicle seats, various outer panels are located onto the seat structure to conceal the frame components and other mechanical aspects of the vehicle seat. Installation of various outer panels can be difficult as sight lines to the various connection points of the outer panels of the vehicle seat can be obstructed. In some cases, these attachment points can be completely concealed from view.

SUMMARY OF THE INVENTION

According to one aspect of the present invention, a vehicle seat includes a seat base, a side shield coupled to the seat base and defining inward and outward surfaces and an attachment tower extending from a central portion of the inward surface to an attachment flange of the seat base. The side shield conceals the attachment tower and the attachment flange, and the attachment tower defines a guide for connecting the attachment tower and flange.

According to another aspect of the present invention, a vehicle seat includes a seat frame having an outwardly-extending flange and an attachment tower extending from an inward surface of a side shield to a receiver end having a wide opening defined at a first end and a slot defined in the second end. The receiver end includes a tapered transition that narrows from the wide opening to the slot for receiving the flange.

According to another aspect of the present invention, a method of attaching a side shield to a seat base of a vehicle includes positioning a side shield proximate a base for a vehicle seat, wherein the base includes an outwardly-extending flange protruding therefrom. The side shield slidably engages along the base, wherein the side shield conceals the flange from view. The flange is engaged with an attachment tower of the side shield, wherein the attachment tower extends integrally from a central portion of an inward surface of the side shield, wherein the attachment tower is positioned between the side shield and the base and is concealed from view when the attachment tower is proximate the flange. The flange is guided into a slot defined within the attachment tower. The attachment tower includes a receiver end and has a wide opening defined at a first end and the slot defined in the second end. The receiver end includes a tapered transition that narrows from the wide opening to the slot for guiding the flange into engagement within the slot. The tapered transition defines a vision-free guide for defining an attachment between the receiver end and the outwardly-extending flange.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
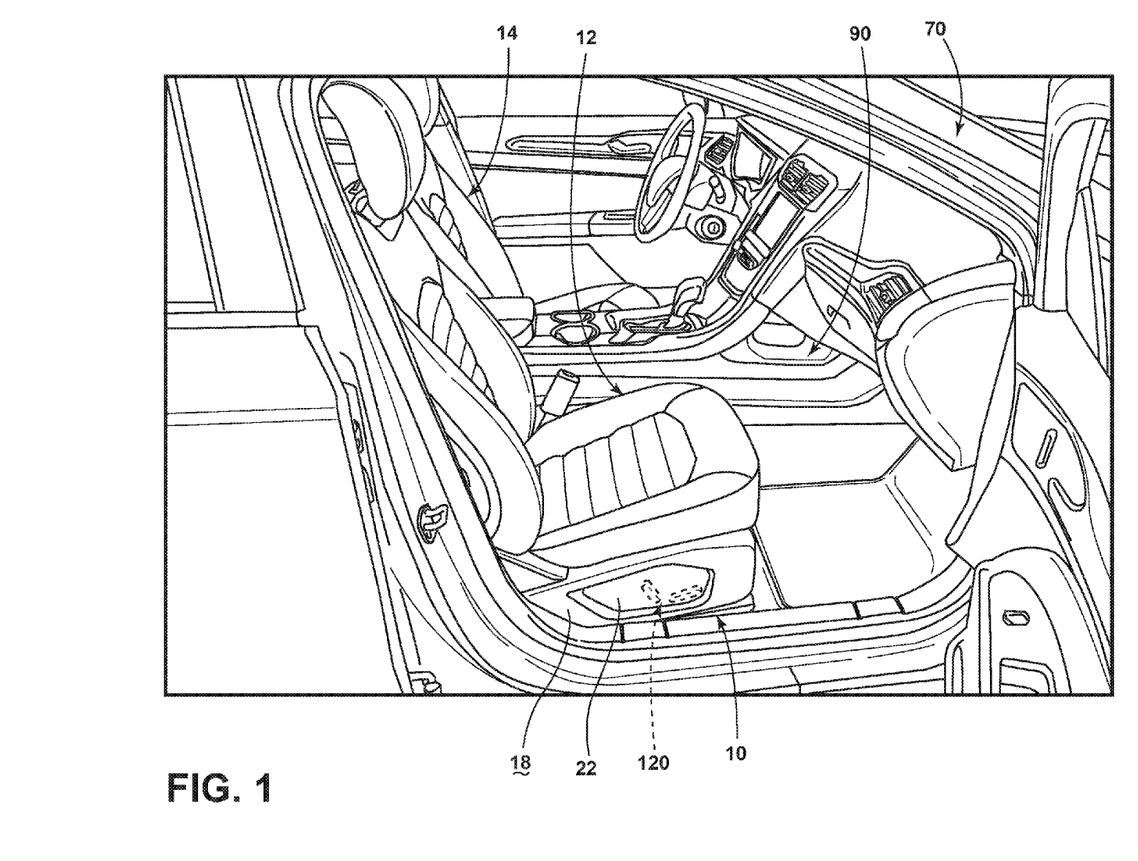
FIG. 1 is a side perspective view of a passenger cabin of a vehicle illustrating a vehicle seat incorporating a side shield having the attachment tower incorporated therein.
Figure 2:
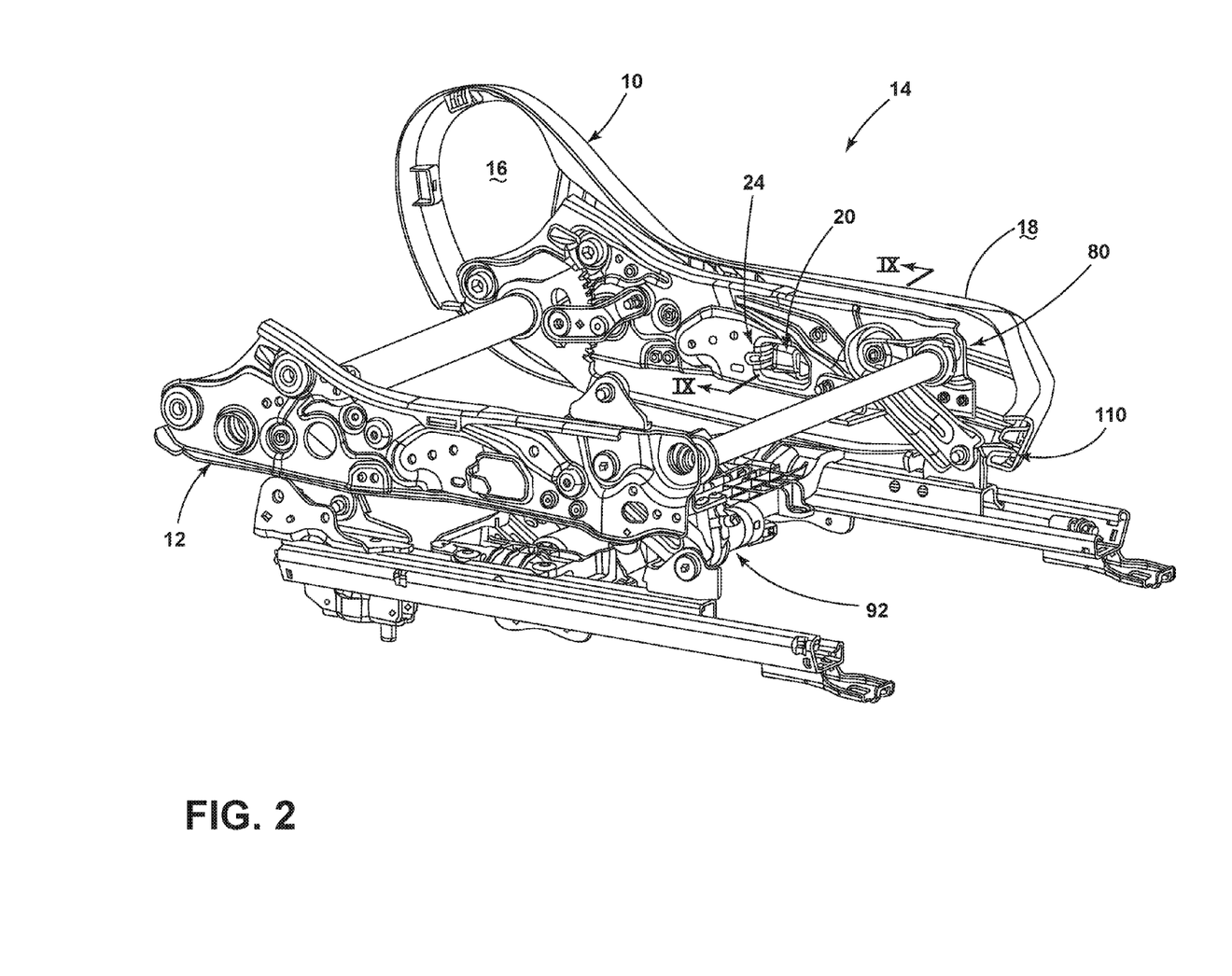
FIG. 2 is a top perspective view of a portion of a vehicle frame with a side shield attached thereto and using the attachment tower for engaging the frame of the vehicle seat.
Figure 3:
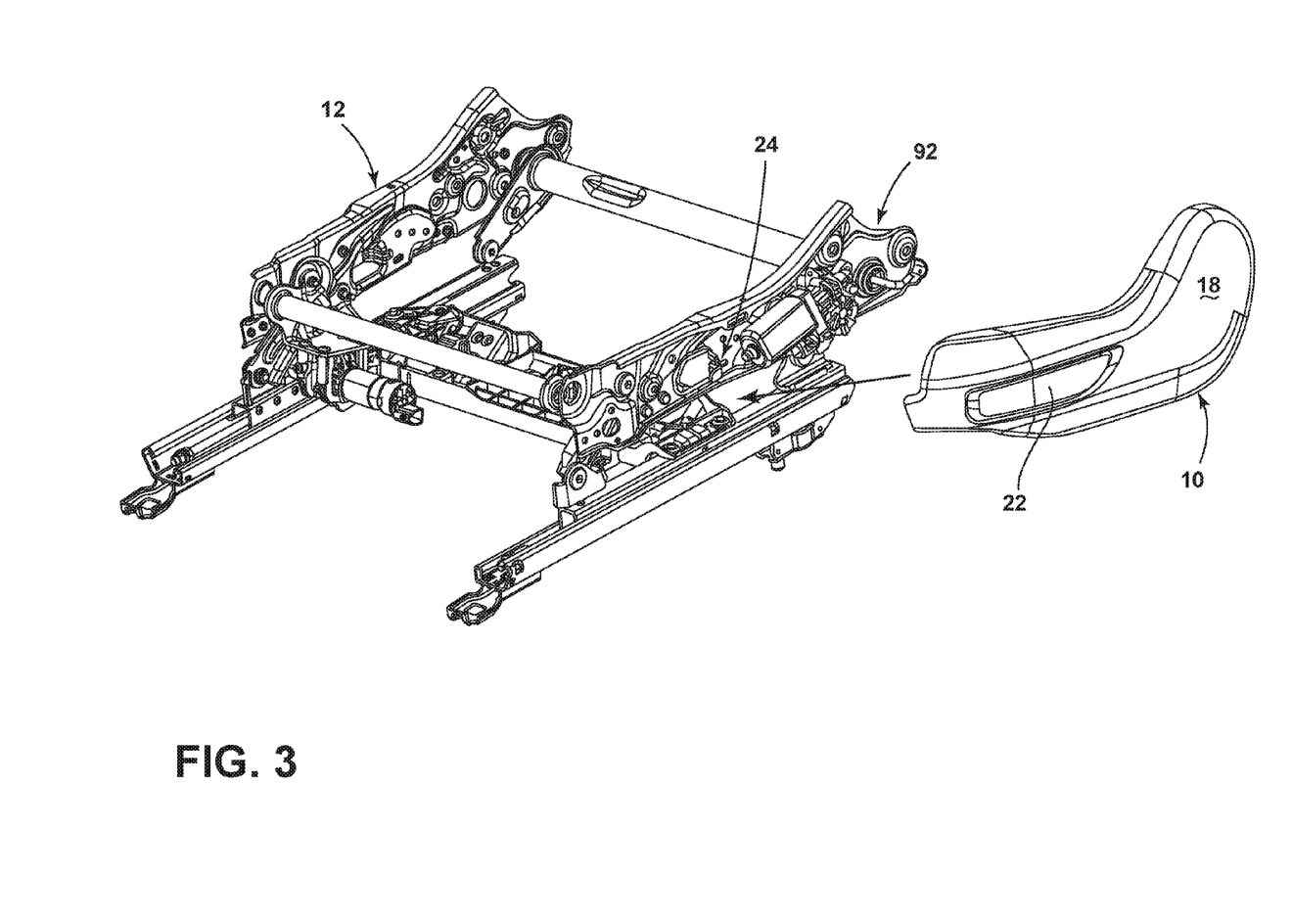
FIG. 3 is a partially exploded side perspective view of the vehicle frame of FIG. 2.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-6, reference numeral 10 generally refers to a side shield that is installed upon a seat base 12 for a vehicle seat 14. The vehicle seat 14 can include a seat base 12 and a side shield 10 coupled to the seat base 12. The side shield 10 defines inward and outward surfaces 16, 18 thereof. An attachment tower 20 extends from a central portion 22 of the inward surface 16 of the side shield 10 and extends to an attachment flange 24 of the seat base 12. The side shield 10 conceals the attachment tower 20 and attachment flange 24 such that the engagement of the attachment tower 20 and attachment flange 24 is hidden from view during installation of the side shield 10 onto the seat base 12. The attachment tower 20 defines a guide 26 for connecting the attachment tower 20 to the attachment flange 24. In this manner, the attachment tower 20 defines a vision-free guide 26 that slidably positions the attachment flange 24 into a slot 28 defined within the attachment tower 20 for receiving the attachment flange 24.

Referring again to FIGS. 1-6, the attachment tower 20 can include a receiver end 40 having a wide opening 42 defining a first end 44 of the receiver end 40. The slot 28 of the attachment tower 20 can be defined within the second end 46 of the receiver end 40. It is contemplated that the receiver end 40 includes a tapered transition 48 that narrows from the wide opening 42 to the slot 28. In this manner, the wide opening 42 defines a large aperture through which the attachment flange 24 can be guided. Accordingly, during installation of the side shield 10, exact positioning of the side shield 10 is not necessary. The side shield 10 can be positioned in a range of positions 52 so long as the attachment flange 24 is positioned within the perimeter 50 of the wide opening 42 of the receiver end 40. The wide opening 42 is significantly larger than the opening defined by the slot 28, within which the attachment flange 24 is ultimately installed and secured. As such, the side shield 10 can be installed by placing the side shield 10 within a range of positions 52 proximate the attachment flange 24. In this manner, the attachment flange 24 can be slidably inserted through the wide opening 42 and along the tapered transition 48 for ultimate installation into the slot 28 of the receiver end 40 for the attachment tower 20.

According to the various embodiments, it is contemplated that the side shield 10 at least partially conceals, and in some cases, completely conceals, both the attachment tower 20 and the attachment flange 24. Accordingly, the engagement between the attachment tower 20 and the attachment flange 24 is concealed from view, and the installation of the side shield 10 is a "blind" installation. The use of the receiver end 40 of the attachment tower 20 having the tapered transition 48 with the wide end transitioning to the narrower slot 28 provides a guide 26 for the installer to use to place the attachment tower 20 on the attachment flange 24. To assist in guiding the attachment flange 24 to the tapered transition 48, the receiver end 40 can include a plurality of structural ribs 60. These structural ribs 60 can extend substantially parallel with a longitudinal axis 62 of the receiver end 40. The longitudinal axis 62 of the receiver end 40 extends through the wide opening 42 and slot 28. This longitudinal axis 62 can be a generally parallel portion of the outward surface 18 of the side shield 10 proximate the attachment tower 20. In this manner, the attachment tower 20 can extend in a generally perpendicular orientation from the inward surface 16 of the side shield 10. As the attachment tower 20 extends generally perpendicular from the inward surface 16 of the side shield 10, the longitudinal axis 62 of the receiver end 40 extends substantially parallel with the inward surface 16 of the side shield 10. It is also contemplated that the longitudinal axis 62 of the receiver end 40 can be positioned at an angle relative to the inward surface 16 of the side shield 10, where the side shield 10 can include various surfaces that generally define the outward appearance of the side shield 10 as reflected in the outward surface 18 of the side shield 10.

Figure 4:
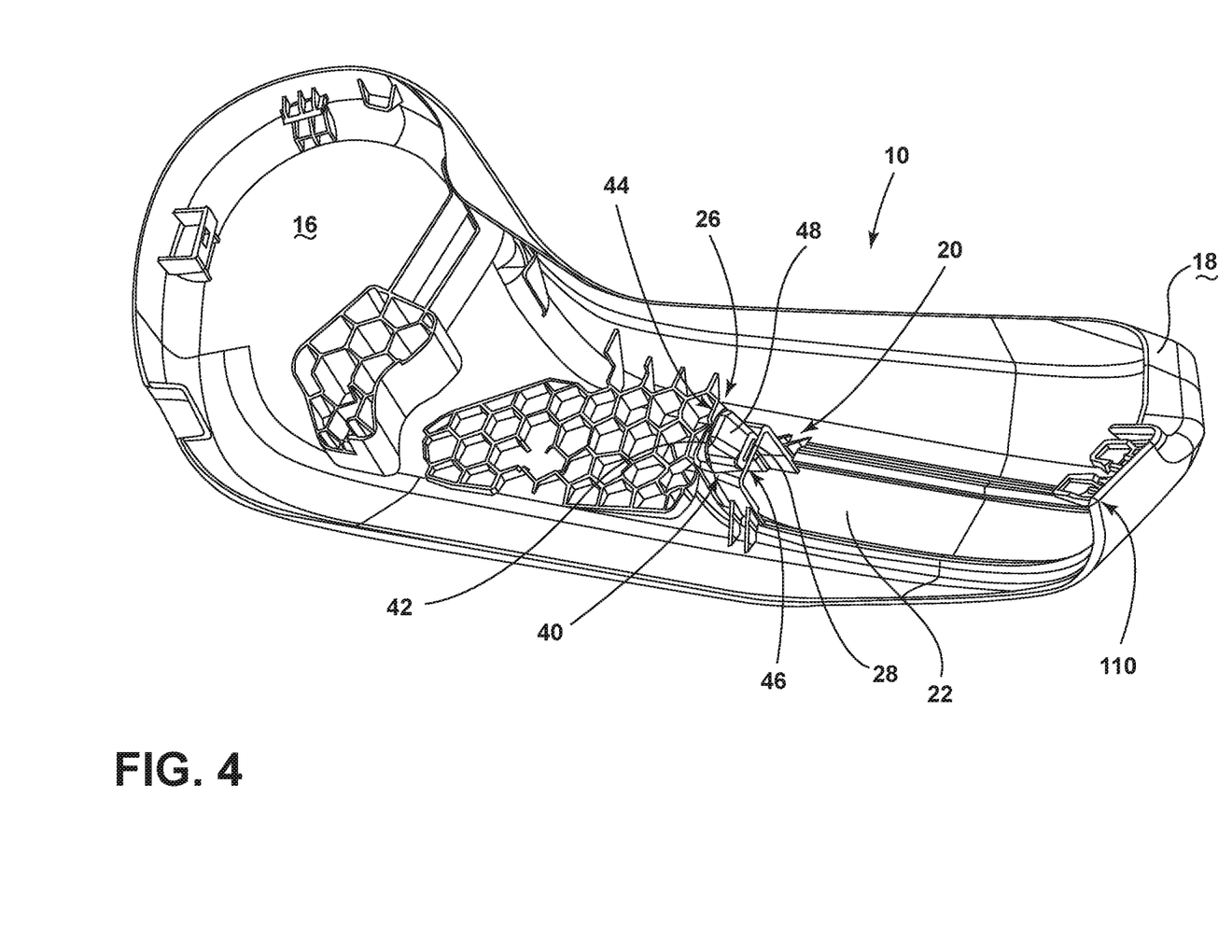
FIG. 4 is a side perspective view of the side shield incorporating an aspect of the attachment tower for installation onto the base of a vehicle seat.
Figure 5:
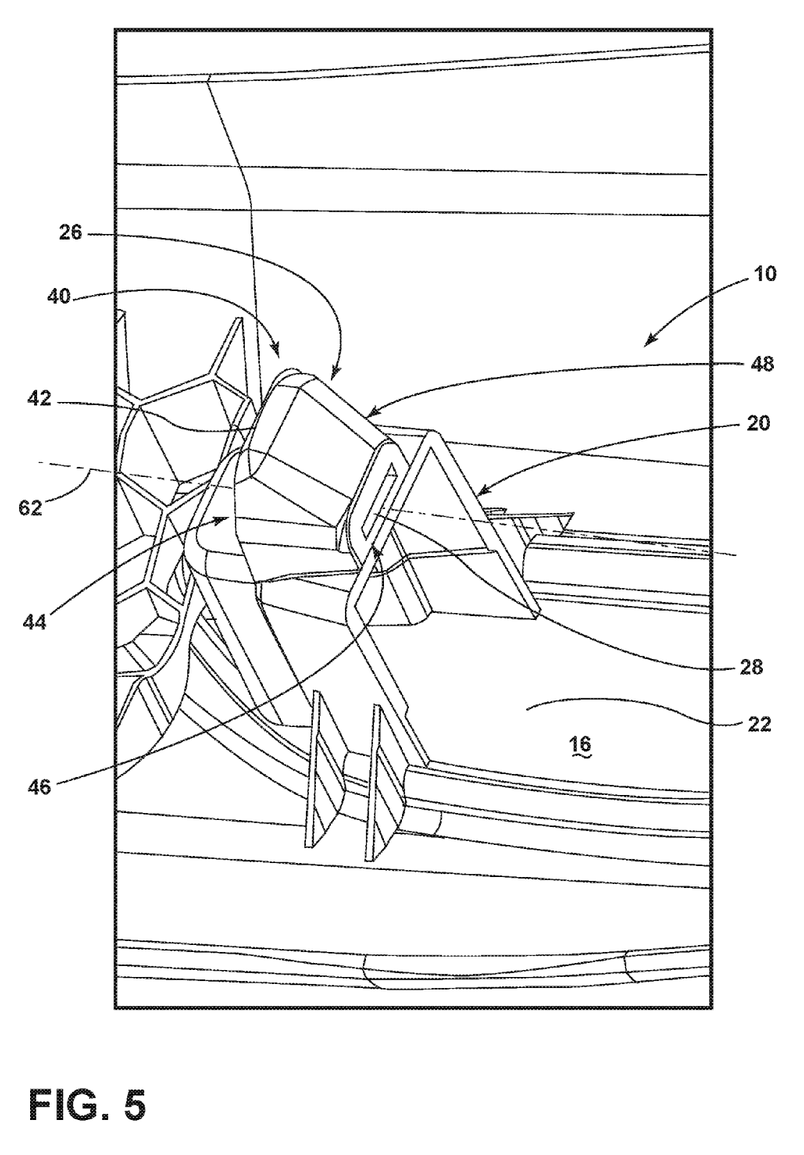
FIG. 5 is an enlarged perspective view of the attachment tower incorporated within the side shield of FIG. 4.
Figure 6:
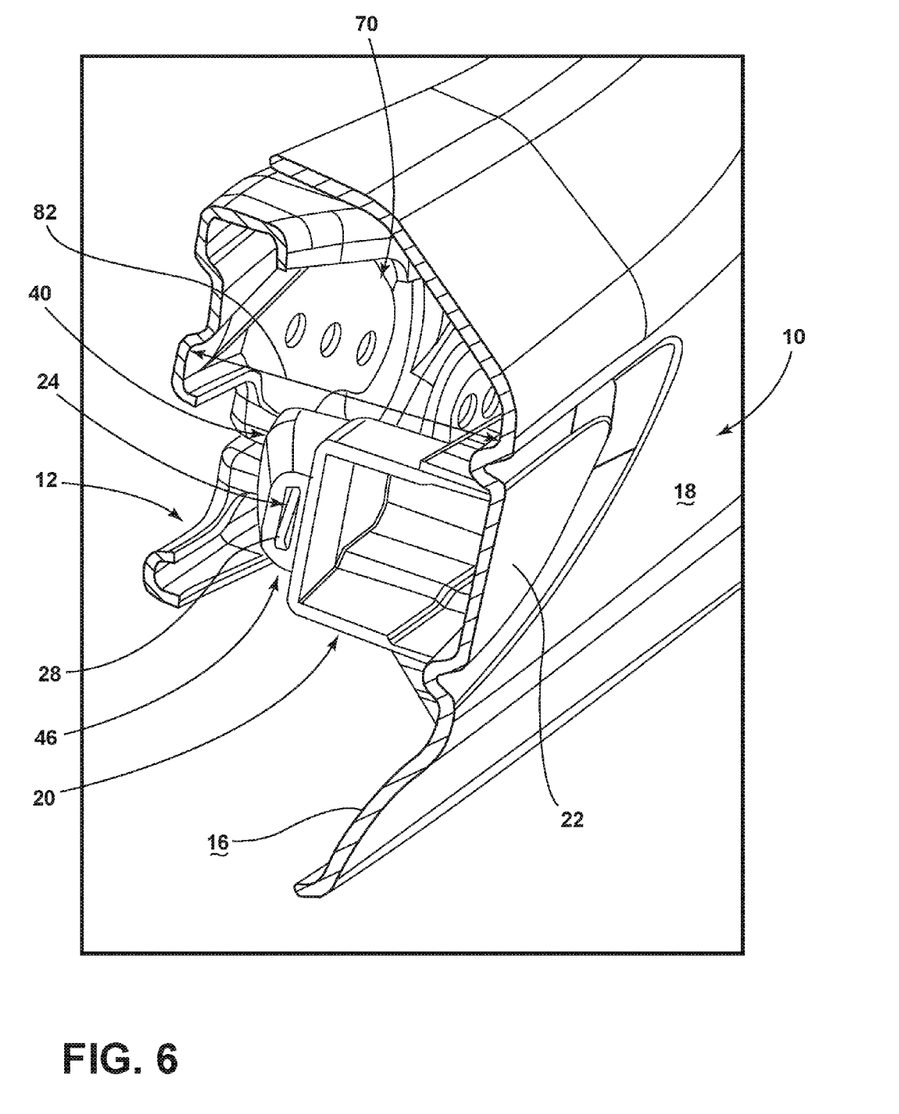
FIG. 6 is a cross-sectional perspective view of an aspect of the side shield engaged with a seat base with the attachment tower of the side shield engaging the attachment flange of the seat base.
Figure 7:
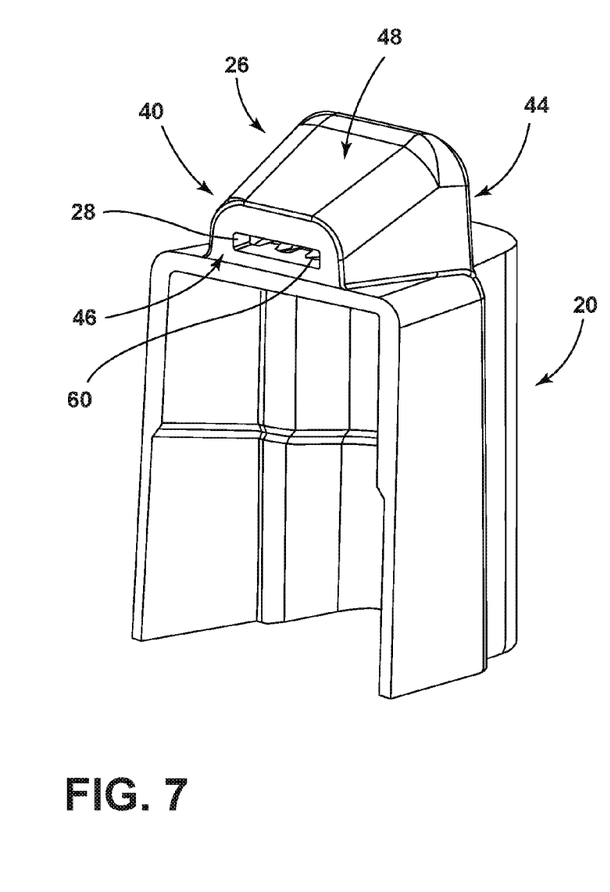
FIG. 7 is a side perspective view of an aspect of the attachment tower.
Figure 8:
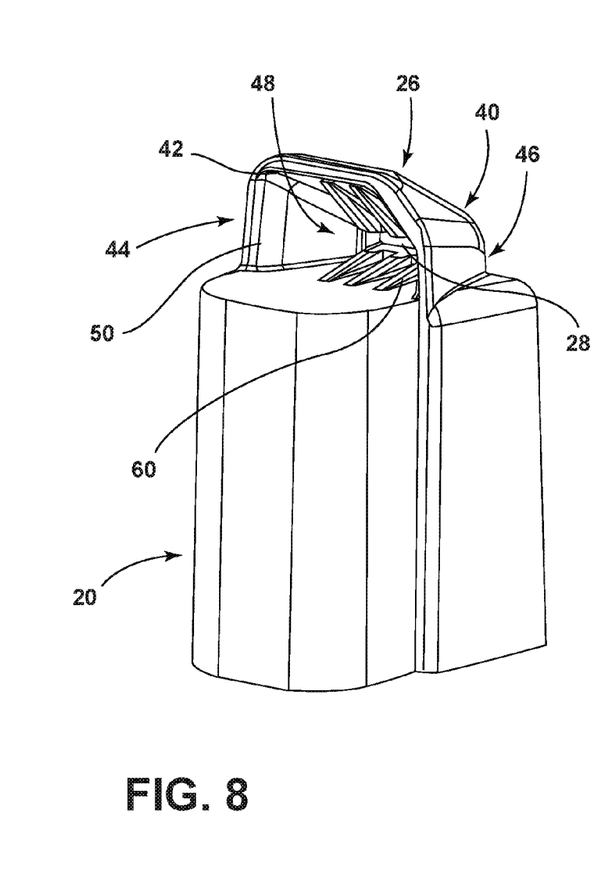
FIG. 8 is a side perspective view of the attachment tower of FIG. 7.
Figure 9:
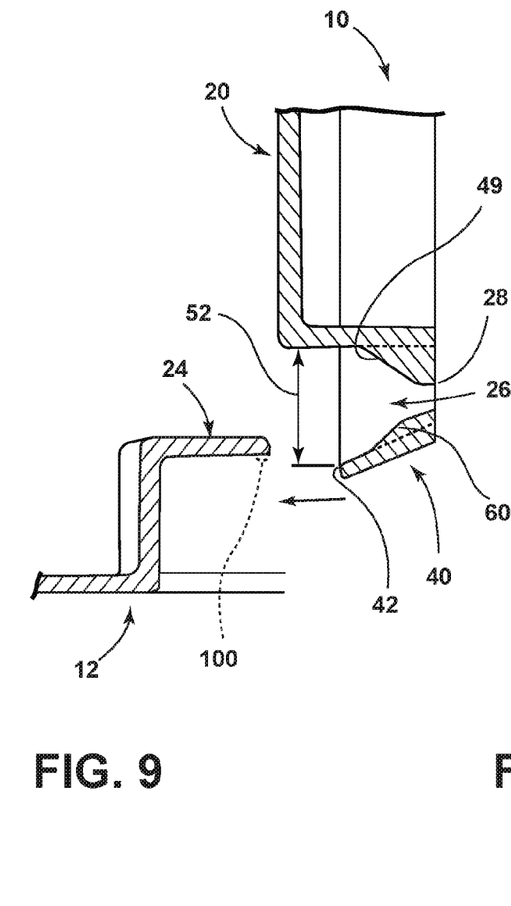
FIG. 9 is a cross-sectional view of the side shield of FIG. 6 taken along line IX-IX and illustrating an aspect of the attachment tower engaged with the attachment flange of the seat base.
Figure 10:
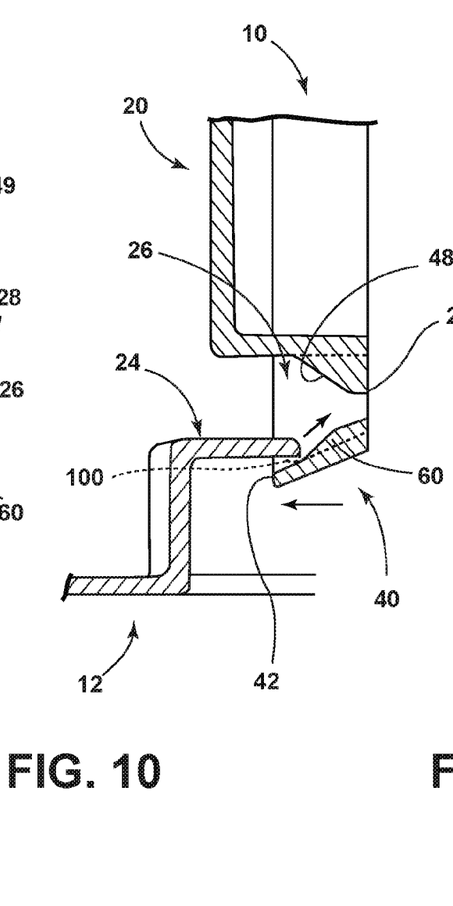
FIG. 10 is a cross-sectional view of the side shield of FIG. 9 illustrating the attachment tower being guided onto the attachment flange.
Figure 11:
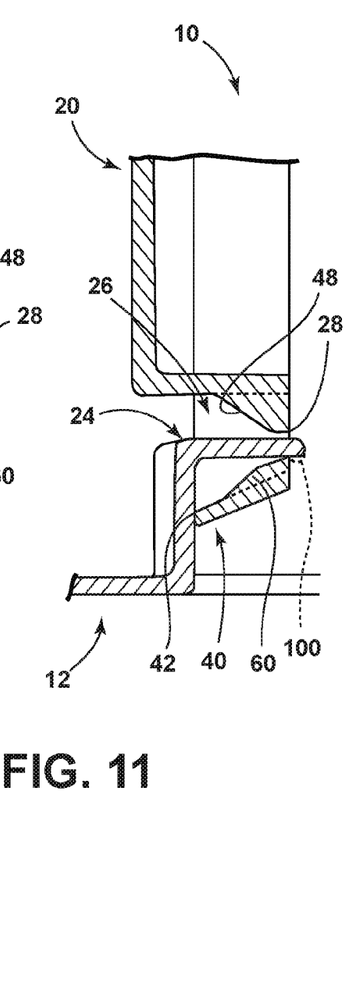
FIG. 11 is a cross-sectional view of the side shield of FIG. 10 illustrating the attachment tower being aligned with the attachment flange for installation.
Figure 12:
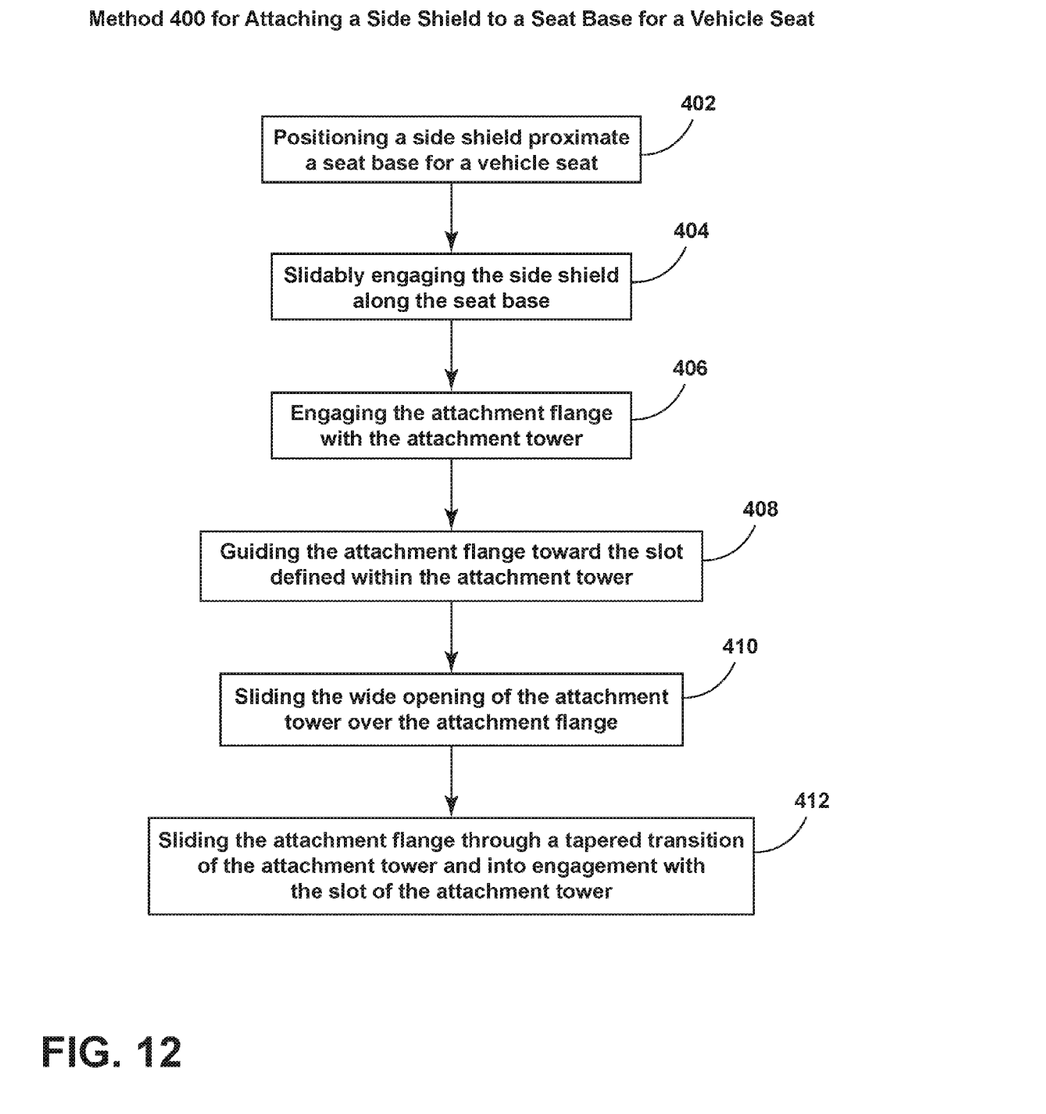
FIG. 12 is a schematic flow diagram illustrating a method of attaching a side shield to a seat base for a vehicle seat.

Referring now to FIGS. 4-6, it is contemplated that the attachment tower 20 can be an integrally formed member that is formed, molded, or otherwise created as part of the side shield 10. Typically, the attachment tower 20 is formed as part of a side shield 10 when the side shield 10 is free of various automatic seat controls 120 that are used to operate mechanical portions of a vehicle seat 14. During manufacture, a standard seat base 12 can be used for various models of a particular vehicle 70. This seat base 12 can be fitted with various mechanical features for controlling the various positions of the seat base 12, lumbar support, and other portions of the vehicle seat 14. Typically, these automatic seat controls 120 are positioned in the side shield 10, and are engaged to the seat base 12. Various structures proximate these controls 120 generally provide structural support between the seat base 12 and the side shield 10. When these controls 120 are not present in a particular vehicle seat 14 for a vehicle model, the side shield 10 is molded as a continuous member with no openings as no controls 120 need to be fitted within the side shield 10. Additionally, these side controls 120 typically include certain structural features that extend between the side shield 10 and the seat base 12 for supporting the central portion 22 of the vehicle side shield 10.

According to the various embodiments, as exemplified in FIGS. 1-6, the incorporation of the integrally formed attachment tower 20 within the central portion 22 of the side shield 10 provides a structural support between the side shield 10 and the seat base 12 in the absence of any automatic seat controls 120 and structural mechanisms attached thereto. The integrally formed attachment tower 20 provides a structural mechanism that extends into a cavity 80 defined between the seat base 12 and side shield 10 for engagement of the attachment tower 20 with the attachment tower 20 that provides structural support between the side shield 10 and seat base 12. The integral nature of the attachment tower 20 serves to prevent the formation of sink marks or other stress-related features that may be evidenced in other conventional structural members disposed between a conventional shield and a conventional base. The use of the attachment tower 20 integrally formed within the side shield 10, as disclosed herein, maintains a predetermined gap 82 defined between the inward surface 16 of the side shield 10 and the seat base 12 or seat frame 92 of the vehicle seat 14.

Referring now to FIGS. 1-11, according to the various embodiments, the vehicle seat 14 can be disposed within a passenger compartment 90 of a vehicle 70, where the vehicle seat 14 includes a seat frame 92 having an outwardly extending flange, that can correspond to the attachment flange 24 of the seat base 12. The attachment tower 20 extends from the inward surface 16 of the side shield 10 to a receiver end 40 of the attachment tower 20. The receiver end 40 includes a wide opening 42 that defines a first end 44 and a slot 28 defining a second end 46 where the receiver end 40 includes a tapered transition 48 that narrows from the wide opening 42 to the slot 28 receiving flange. When the outwardly extending flange, or attachment flange 24, is installed within the receiver end 40 of the attachment tower 20, the attachment flange 24 extends through both the wide opening 42 and the slot 28. In various embodiments, the attachment flange 24 can include an engaging tab 100 that extends substantially perpendicular to the attachment flange 24. The engaging tab 100 serves to bias a portion of the receiver end 40 proximate the slot 28 outward to allow the engaging tab 100 to pass through. Once the engaging tab 100 is passed through the slot 28, a portion of the receiver end 40 biases back to its original position and the engaging tab 100 substantially prevents movement of the attachment flange 24 back through the slot 28, thereby preventing disengagement of the attachment flange 24 with the attachment tower 20.

Referring again to FIGS. 2-4, during installation of the side shield 10 onto the seat base 12, the side shield 10 is slidably engaged with a portion of the seat base 12. In addition to the engagement between the attachment tower 20 and the attachment flange 24, various other connecting features 110 defined within the side shield 10 slidably engage portions of the seat base 12. In this manner, the engagement between the attachment flange 24 and the attachment tower 20 helps to align the side shield 10 with the seat base 12 for connecting the attachment flange 24 with the attachment tower 20 and also helping in the engagement between the other connection portions of the side shield 10 with the seat base 12.

Referring now to FIGS. 1-12, having described the various aspects of the attachment tower 20 of the side shield 10, a method 400 is disclosed for attaching a side shield 10 to a seat base 12 for a vehicle seat 14. The method 400 includes a step 402 of positioning side shield 10 proximate a seat base 12 for a vehicle seat 14. The seat base 12 includes an outwardly-extending flange, such as the attachment flange 24, protruding therefrom. The side shield 10 is slidably engaged along the seat base 12 (step 404). In this manner, the side shield 10 conceals both the attachment tower 20 and the attachment flange 24 from view, such that the engagement between the side shield 10 and the seat base 12 is a "blind" operation that is hidden from the view of the installer. During installation, the attachment flange 24 is engaged with the attachment tower 20 of the side shield 10 (step 406). The attachment tower 20 extends integrally from a central portion 22 of an inward surface 16 of the side shield 10, and the seat base 12 defined therebetween. In this manner, the attachment tower 20 and the attachment flange 24 are concealed from view when the attachment tower 20 is proximate the attachment flange 24. During installation, the attachment flange 24 is guided into a slot 28 defined within the attachment tower 20 (step 408). The attachment tower 20 includes a receiver end 40 having a wide opening 42 defined in a first end 44 and a slot 28 defined in the second end 46. During installation, the wide opening 42 of the attachment tower 20 can be slid over the attachment flange 24, such that the attachment flange 24 enters into the tapered position of the receiver end 40 (step 410). The attachment flange 24 is then slid through the tapered transition 48 and into engagement with the slot 28 to secure the attachment flange 24 within the slot 28 and the attachment tower 20 (step 412). In this manner, the receiver end 40 and the tapered transition 48 defined therein define a vision-free guide 26 for defining attachment between the receiver end 40 and the outwardly extending flange or the attachment flange 24 of the seat base 12.

According to the various embodiments, as exemplified in FIGS. 1-12, the attachment flange 24 can be made of various rigid materials that can include, but are not limited to, metals, alloys, composite materials, polymers, combinations thereof, and other similar rigid materials that provide a structural feature to which the attachment tower 20 can be connected. It is also contemplated that the side shield 10 can be made of a substantially formable material that can include, but is not limited to, plastic, various polymers, composite materials, formable metals, combinations thereof, and other similar materials that can be used for forming an exterior panel, such as a side shield 10, for a vehicle seat 14.

According to the various embodiments, the incorporation of the attachment tower 20 within the side shield 10 can also be included within other interior panels of the vehicle 70. Such panels can include, but are not limited to, other shield panels of the vehicle seat 14, interior panels of the passenger cabin, dashboard panels, console panels, and other similar interior paneling positioned within or near the passenger cabin of the vehicle 70.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seat comprising:
   a side shield coupled to a seat base and defining inward and outward surfaces; and
   an attachment tower extending from a central portion of the inward surface to an attachment flange of the seat base, wherein the side shield conceals the attachment tower and the attachment flange, and wherein the attachment tower is integrally molded with the side shield and defines a guide for connecting the attachment tower and flange, and wherein the attachment flange extends through a slot defined within the attachment tower.

2. The vehicle seat of claim 1, wherein the attachment tower defines a slot for receiving the attachment flange.

3. The vehicle seat of claim 2, wherein the guide defined by the attachment tower is a vision-free guide that slidably positions the attachment flange into the slot defined within the attachment tower.

4. The vehicle seat of claim 1, wherein the attachment tower is integrally formed as part of the side shield.

5. The vehicle seat of claim 1, wherein the seat base and the side shield define a cavity therebetween, wherein the attachment tower and attachment flange engage within the cavity.

6. The vehicle seat of claim 1, wherein the side shield is free of automatic seat controls.

7. The vehicle seat of claim 2, wherein the attachment tower includes a receiver end having a wide opening defined at a first end and the slot defined in the second end, wherein the receiver end includes a tapered transition that narrows from the wide opening to the slot.

8. The vehicle seat of claim 7, wherein the receiver end defines a longitudinal axis extending through the wide opening and the slot, wherein the longitudinal axis is parallel with a portion of the outward surface of the side shield proximate the attachment tower.

9. A vehicle seat comprising:
   a seat frame having an outwardly-extending flange; and
   an attachment tower extending from an inward surface of a side shield to an enclosed receiver end having a wide opening defined at a first end and a slot defined in a second end, wherein the receiver end includes a tapered transition extending through the receiver end that narrows from the wide opening to the slot for receiving the flange.

10. The vehicle seat of claim 9, wherein the outwardly-extending flange extends through both the wide opening and the slot.

11. The vehicle seat of claim 9, wherein the attachment tower is integrally formed as part of the side shield.

12. The vehicle seat of claim 9, wherein the tapered transition includes a vision-free guide for defining an attachment between the receiver end and the outwardly-extending flange.

13. The vehicle seat of claim 9, wherein the side shield is free of a seat control interface.

14. The vehicle seat of claim 9, wherein the tapered transition is at least partially defined by reinforcing ribs that extend toward the slot.

15. The vehicle seat of claim 9, wherein the attachment tower extends perpendicularly from a central portion of the inward surface of the side shield.

16. The vehicle seat of claim 9, wherein engagement between the outwardly-extending flange and the receiver end maintains a predetermined gap defined between the inward surface of the side shield and the seat frame.

17. A method of attaching a side shield to a vehicle seat of a vehicle, the method comprising steps of:
  positioning a side shield proximate a seat base, wherein the seat base includes an outwardly-extending flange protruding therefrom;
  slidably engaging the side shield along the seat base, wherein the side shield conceals the flange from view;
  engaging the flange with an attachment tower of the side shield, wherein the attachment tower extends integrally from a central portion of an inward surface of the side shield, wherein the attachment tower is positioned between the side shield and the seat base and is concealed from view when the attachment tower is proximate the flange; and
  guiding the flange into a slot defined within the attachment tower, wherein the attachment tower includes a receiver end having a wide opening defined at a first end and the slot defined in the second end, wherein the receiver end includes a tapered transition that extends through the receiver end and narrows from the wide opening to the slot for guiding the flange into engagement within the slot, wherein the tapered transition defines a vision-free guide for defining an attachment between the receiver end and the outwardly-extending flange.

18. The method of claim 17, wherein engagement between the outwardly-extending flange and the receiver end maintains a predetermined gap defined between the inward surface of the side shield and the seat base.

19. The method of claim 17, wherein the step of engaging the flange with the attachment tower includes:
  sliding the wide opening over the flange and into the tapered transition; and
  sliding the flange through the tapered transition and into the slot.

20. The method of claim 17, wherein the side shield is free of automatic seat controls.

* * * * *